(12) United States Patent
Gimmler et al.

(10) Patent No.: US 6,460,408 B1
(45) Date of Patent: Oct. 8, 2002

(54) METHOD FOR DETERMINING RELEVANT VARIABLES REPRESENTING THE PRESSURE IN THE CYLINDERS OF AN INTERNAL COMBUSTION ENGINE

(75) Inventors: Helmut Gimmler, Schwaikheim; Igor Gruden, Leonberg; Kai Holdgrewe, Schwaikheim; Ulrich Nester, Stuttgart; Stefan Pischinger, Acachen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/534,312

(22) Filed: Mar. 23, 2000

Related U.S. Application Data

(63) Continuation of application No. PCT/EP98/05228, filed on Aug. 18, 1998.

(30) Foreign Application Priority Data

Sep. 23, 1997 (DE) .......................................... 197 41 884

(51) Int. Cl.$^7$ ............................... G01L 3/26; B60T 7/12
(52) U.S. Cl. ...................................... 73/117.3; 701/106
(58) Field of Search ............................... 73/116, 117.3; 701/106, 113; 123/494

(56) References Cited

U.S. PATENT DOCUMENTS 4,761,993 A  8/1988  Klepacki
5,109,695 A  * 5/1992  James et al. ................ 73/117.3

FOREIGN PATENT DOCUMENTS

DE            19529708 C1    8/1995

OTHER PUBLICATIONS

"Revue Automobile", vol. 85, No. 15, Apr. 5, 1990, p. 17, Bern CH.
"Proceedings of ICASSP '94, IEEE International Conference on Acoustics, Speech and Signal Processing", vol. 4 99–22, Apr. 1994, pp. IV–149 to IV–152, Detlef Koenig and Johann F. Boehme.

* cited by examiner

*Primary Examiner*—Benjamin R. Fuller
*Assistant Examiner*—Maurice Stevens
(74) *Attorney, Agent, or Firm*—Crowell & Moring LLP

(57) ABSTRACT

A method for determining internal pressure in the cylinders of an internal combustion engine by measuring and analyzing structure borne noise signals using a neural network.

7 Claims, 2 Drawing Sheets

METHOD FOR DETERMINING RELEVANT VARIABLES REPRESENTING THE PRESSURE IN THE CYLINDERS OF AN INTERNAL COMBUSTION ENGINE

This application is a continuation of International Patent Application PCT/EP98/05228, filed Aug. 18, 1998, which claims the priority of German Application No. 19741884.8, filed Sep. 23, 1997, the disclosure of which is expressly incorporated by reference herein.

BACKGROUND AND SUMMARY OF THE INVENTION

The present invention relates to a method for determining relevant variables representing the internal pressure in the cylinders of an internal combustion engine, the relevant variables being derived from another measured variable.

U.S. Pat. No. 4,761,993 discloses the use of the structure-borne noise of the internal combustion engine as the other measured variable. In this case, the internal cylinder pressure is measured in a reference internal combustion engine and subjected to cross correlation with vibration signals which are recorded at various points of the internal combustion engine. The frequency band in which these signals are evaluated is specified in this case at up to 30,000 Hz. In order in this case to be able to generate defined load conditions, the method described is used to be able to undertake a functional test of the vehicle in a workshop during maintenance of the vehicle.

It is known from the Journal "Revue Automobile, Vol. 85, No. 15, Apr. 5, 1990, page 17, Bern/CH" to undertake a cross correlation between a vibration signal, which is measured on an engine, and the crank angle position, in order to obtain information on the internal cylinder pressure.

The publication "Proceedings of ICASSP '94, IEEE International Conference on Acoustics, Speech and Signal Processing, Vol. 4 99–22 April 1994, pages IV-149 to IV-152, Adelaide/AU" discloses a model used to draw a conclusion on the internal cylinder pressure from measured structure-borne noise signals by calculating the internal cylinder pressure from the measured structure-borne noise signals with the aid of this model. In this case, a constant speed of the internal combustion engine is prescribed as a boundary condition for the model.

The German laid-open patent application number DE 40 06 273 A1 has furthermore disclosed the determination of a transfer function between one of the variables of travel, speed or acceleration, which are detected at the engine block, and the internal cylinder pressure. The corresponding variable travel, speed or acceleration is detected in this case by means of a strain gauge or an arrangement which uses the laser Doppler effect. The transfer function is determined by detecting on a test stand both the appropriate variable and the internal cylinder pressure. The measured signals are subsequently transformed into the frequency domain in which the transfer function is then obtained by forming the autocorrelate and cross-correlate relating to the corresponding signals. After the transfer function relating to a specific engine type has been obtained on the test stand, the transfer function thus obtained is subsequently used together with the corresponding engine type in order to be able to determine the internal cylinder pressure from the measured signal. Furthermore, the crank angle is determined in order to be able to plot the characteristic of the internal cylinder pressure against the crank angle.

Also known is a method in accordance with which pressure sensors are installed in the cylinder head and used to detect the temporal characteristic of the cylinder pressure. The cylinder pressure can be detected with the aid of this method. However, it is disadvantageous in this case that installing the sensor is comparatively complicated. A plurality of sensors have to be installed in an internal combustion engine in accordance with the number of cylinders. Such a method has therefore been used only on the test stand in the case of the prior art mentioned at the beginning, in order to be able to use a simpler measured variable for diagnosis and/or control/regulation in the case of the relatively large number of motors used.

A further method is disclosed in DE 44 21 950 A1 in which various input variables have been specified for diagnosing and regulating an internal combustion engine. One of these input variables can be, for example, the acoustic sound of the internal combustion engine, which is to be detected by a microphone and evaluated by means of a neural network.

U.S. Pat. 5,093,792 discloses the detection of fault states such as, for example, misfires, knocking (self-ignition of the mixture before the actual ignition point). These fault states are to be detected by means of a neural network to whose input the internal cylinder pressure is to be fed as a measured variable.

By contrast, it is the object of the invention to provide a method for detecting the cylinder pressure in internal combustion engines in a way which is easy to implement during ongoing operation. This method is intended, moreover, to master various operating conditions as flexibly as possible.

This object is achieved according to the invention by a method in which the cylinder pressures of a test engine are determined from the structure-borne noise of the internal combustion engine by using a neural network. The neural network is trained by using measured structure-borne noise signals from other engines together with associated previously measured signals representing the cylinder pressures. The cylinder pressure of a test engine can be subsequently determined by the trained neural network, based on test engine noise-signal values.

The cylinder pressure can be determined with adequate precision on the basis of the variable structure-borne noise, which can be measured with comparative ease. It is possible by using a neural network to draw accurate conclusions concerning the cylinder pressure from the measured signals with high accuracy, because the neural networks are tolerant of noisy input signals.

With regard to the advantageous use of the neural network, reference may be made furthermore to German Patent DE 195 28 708 C2 which discloses determining the compression of an internal combustion engine by operating the internal combustion engine via the starter, there being no ignition of the internal combustion engine, and the evaluation of the compression being performed via an evaluation of the current of the starter. Compression losses have effects on the starter current, something which is to be taken into account by means of various calibration curves, which are obtained by means of neural networks. The method of this prior art is also based on investigating the internal combustion engine during maintenance. There is no continuous monitoring during ongoing operation.

According to the present invention, the structure-borne noise signals are transformed into the time-frequency domain. Consequently, the fact that the frequencies of the structure-borne noise change with time is taken into account. The frequency analysis of the signals is undertaken in each case in time slots, in order to be able to distinguish differences in the frequency spectrum, for example in the case of an ignition which has just been performed, from the frequency spectrum at the end of the power stroke.

In accordance with another aspect, a neural network is used in order to derive the values for all cylinders. Therefore, there is an increase in outlay during the learning phase, so that advantageously there is a need during ongoing operation for the presence of only one neural network.

Furthermore, one neural network can be used in order to derive the relevant variables representing the internal pressure of one cylinder. In this case, there is a reduction in the outlay during the learning phase because each of the neural networks must learn only the conditions at one cylinder. The structure-borne noise signal, which is produced in temporal conjunction with the opening of the exhaust valve or the exhaust valves of the respective cylinder, is used on the impact variable of the neural network. This structure-borne noise signal supplies a signal characteristic of the respective load of the internal combustion engine.

In another variation, the structure-borne noise signal, which is produced during ignition of the mixture of the respective cylinder in the following power stroke of the internal combustion engine, is used as the impact variable of the neural network.

This structure-borne noise is correlated with its cause, that is to say the combustion in the internal combustion engine, with the result that it is possible to produce a unique relationship between the structure-borne noise and the cylinder pressures.

The power of the structure-borne noise signal may also be used as the impact variable of the neural network. The signal power is a variable which can be determined comparatively easily and has exhibited good correlation results with the relevant variables. Also, the easily determined absolute maximum value of the structure-borne noise signal can be the input variable of the neural networks.

It is advantageous that only a single variable is used as input signal of the neural network. Both in the learning phase of the neural network and in the subsequent evaluation phase, the computational outlay is substantially reduced by comparison with a signal which represents the time characteristic of the structure-borne noise and must be processed with a correspondingly adequate number of interpolation points.

A combination of the power of the structure-borne noise signal and the maximum value of the structure-borne noise signal can be used as the input variable with the power of the structure-borne noise signal being given a higher weighting in the upper load range than the maximum value of the structure-borne noise signal, and the maximum value of the structure-borne noise signal being given a higher weighting in the lower load range than the power of the structure-borne noise signal. It is possible to achieve a particularly good correlation of the input signals with the relevant variables by means of this combination of the input signals.

It is also possible that the mean indicated internal cylinder pressure can be the relevant variable. In checks of the learned weightings of the neural network, this variable, which can be effectively used to control or regulate the internal combustion engine, exhibited good correlation with the input signals. The relevant variable may be the maximum value of the internal cylinder pressure or the change in the internal cylinder pressure with the crank angle.

The characteristic of the internal cylinder pressure as a function of the crank angle may also be used as the relevant variable. This signal characteristic is the most informative output signal, although the computational outlay is greater than in the case of the other relevant variables described.

In accordance with one embodiment, the structure-borne noise sensor is fitted outside on the engine block in the region of the combustion chamber of the respective cylinder. Consequently, the structure-borne noise of the engine block is measured in the immediate vicinity of the site where the cause of its production is to be sought. Moreover, disturbing extraneous noises such as, for example, from the water pump, the generator, the compressor of the air conditioner, the valves or similar are less pronounced there.

In another embodiment, the structure-borne noise sensor is fitted on the inlet side of the engine block. This fitting site has the advantage that the engine block is not so hot on the inlet side as on the exhaust side, with the result that it is easier to fasten the sensor on this side with the aid of an adhesive.

In another variation, the structure-borne noise sensor can be fitted on the exhaust side of the engine block. Particularly in the case of the evaluation of the structure-borne noise signals for open exhaust valves, this fitting of the sensor proves to be advantageous because of the proximity to the cause of the structure-borne noise which is to be detected.

A further advantage of the present invention is that the structure-borne noise sensor can be simultaneously used as a knocking sensor. Consequently, it is possible to save outlay with regard to the sensor system when the appropriate sensor is evaluated for a plurality of applications.

When a plurality of structure-borne noise sensors are present the signals can be averaged, resulting in signals which can be better evaluated.

Other objects, advantages and novel features of the present invention will become apparent from the following detailed description of the invention when considered in conjunction with the accompanying drawings.

BRIEF DESCRIPTION OF THE DRAWINGS

An exemplary embodiment of the invention is represented in more detail in the drawing, in which, in detail.

DETAILED DESCRIPTION OF THE PREFERRED EMBODIMENT

Figure 1:
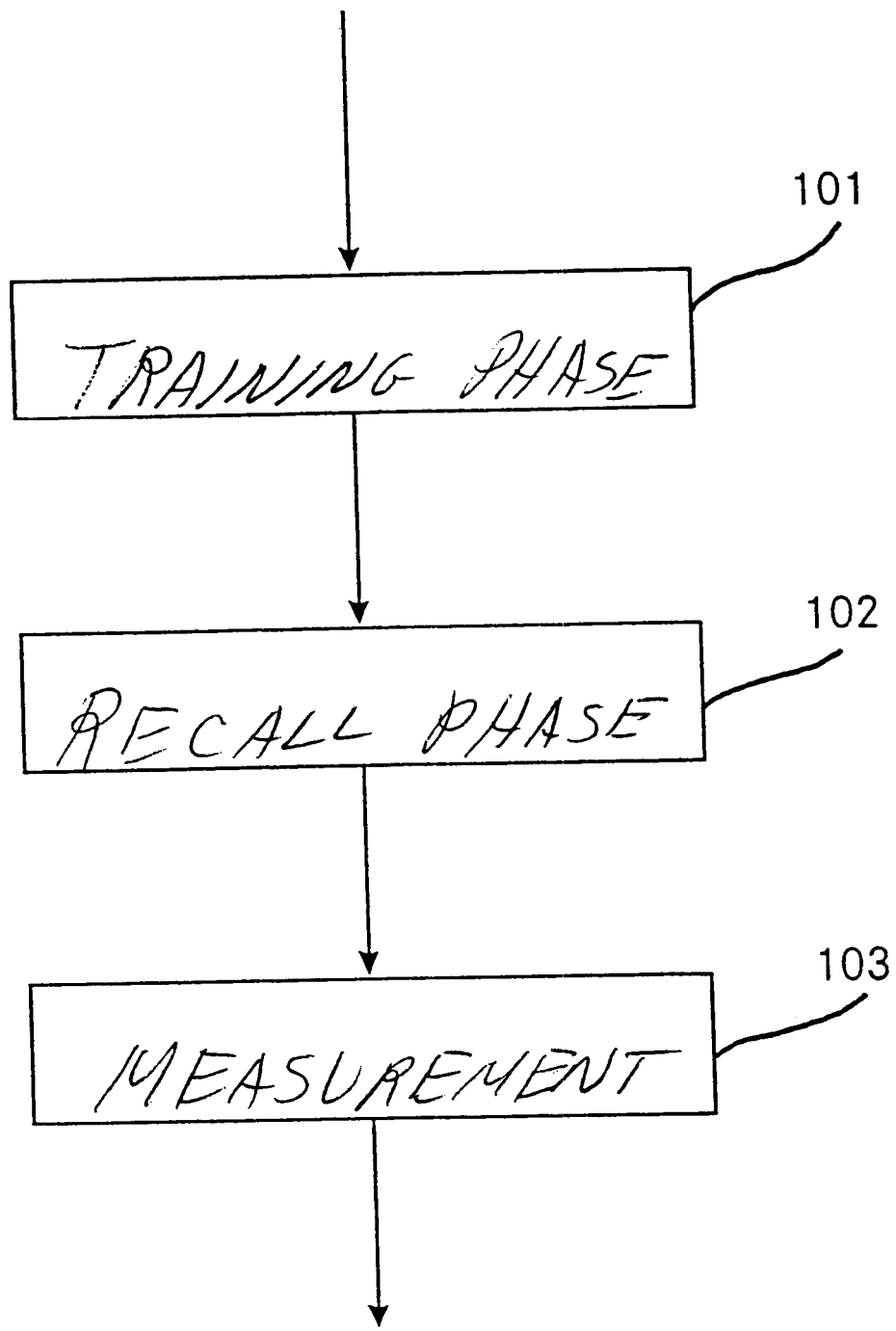
FIG. 1 shows a representation of a mode of procedure for processing learning data by the neural network.

FIG. 1 shows the representation of a block diagram in which the neural network is firstly trained in a step 101 with the aid of training data.

In a first step 101 the neural net is trained by providing a known data set measured on a specific engine. A known data set includes body noise signals and corresponding cylinder pressure. During this training phase 101, the neural network learns a form of a "computation rule" to establish a learned relationship between the cylinder pressure determined and the body noise signal.

The quality of training of the network is then checked with a second set of data in the recall phase of 102. The neural network applies the learned "computation rule" to the second data. The second set of data is a measured data but is not used for training the neural network. Instead it is used to "test" the neural network. The second set of data includes noise signals but the cylinder pressure is not fed to the network. That is, the body noise signals of the second set are fed into the neural network and this network, using the "computation rules" from the training phase 101, provides a correspondence output cylinder pressure. This corresponding output cylinder pressure is then compared with the actual known set of cylinder pressure data. The error of the network is then the difference between the output from the neural network in the recall phase 102 and the set point, which is the measured cylinder pressure of the second set data. This procedure for error calculation is standard in neural networks and in mathematics.

In neural networks, a distinction therefore exists between the training phase 101 which uses a data which the network uses to "learn" and the recall phase 102 wherein a second set of values for noise are known but are fed to the network as a test to determine what the output values for the cylinder pressure would be using its previous "training" in phase 101. In this recall phase a check is then performed to determine if the "computational rule" learned in the training phase 101 determines the correct cylinder pressure with a sufficiently small error when applied to a specific engine. If the recall phase is successful, then in normal use in step 103 only the body noise is measured and the cylinder pressure is determined from that body noise using the trained and tested neural network. In normal use there is no separate measurement of the cylinder pressure.

It is also conceivable within the scope of a diagnosis to average the input signals over a plurality of working cycles of the internal combustion engine.

Figure 2:
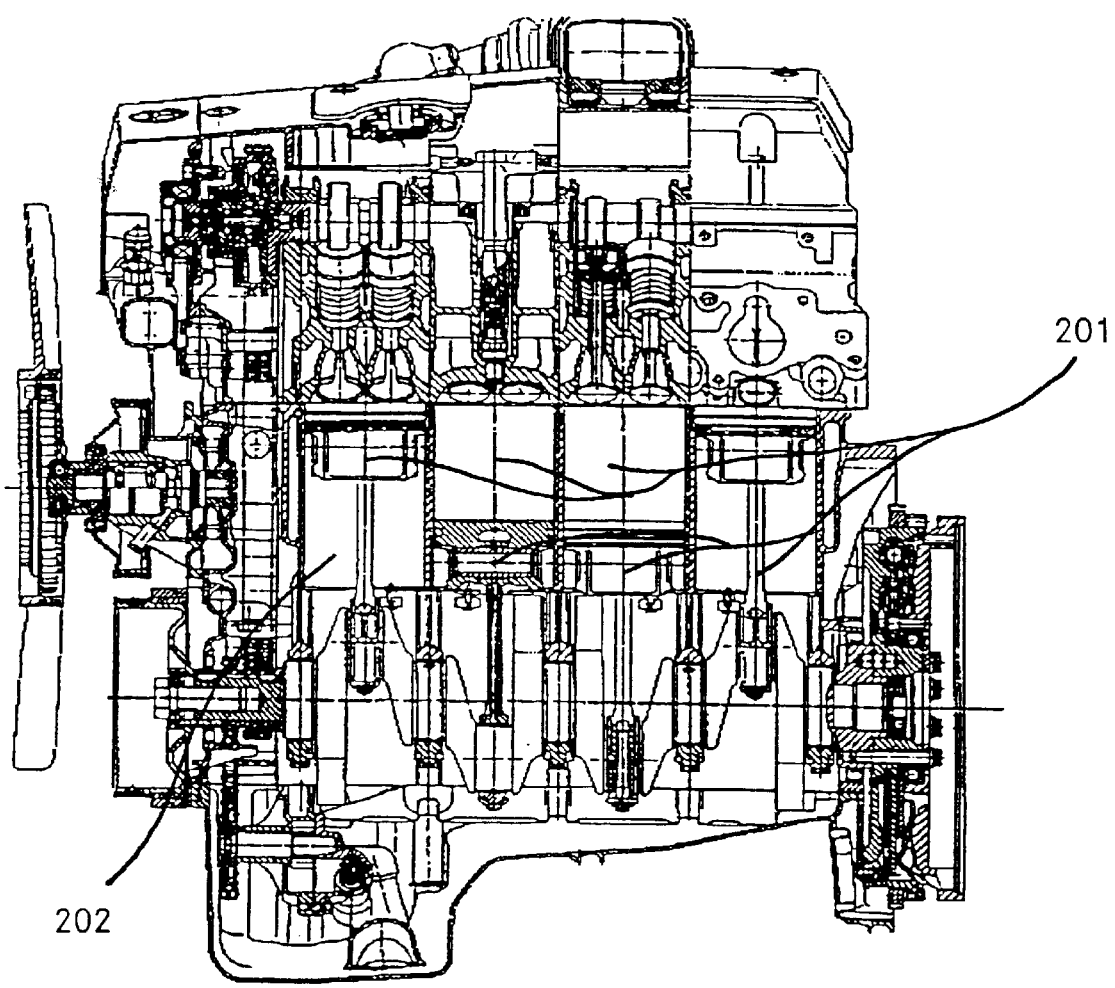
FIG. 2 shows a representation of the principle of suitable sensor positions on an internal combustion engine.

The measurement of structure-borne noise signal can be accomplished with the aid of sensors positioned, as shown in FIG. 2. The structure-borne noise sensor 201 is fitted outside of the engine block 202 in the region of the combustion chamber of a cylinder while the sensor 210 is fitted on the inlet side of the block 202. The sensor 201 may also be fitted on the inlet side of the engine block or on the exhaust side and the sensor may simultaneously be used as a knocking sensor. Alternatively, these various positions may be occupied by a plurality of sensors 201.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining internal pressure in the cylinders of a specific internal combustion engine based on measured structure-borne noise of the internal combustion engine by using a neural network, comprising the acts of:

training the neural network during a training phase using training data wherein said training data includes signals representing training measured structure-borne noise values which are paired with associated signals representing corresponding training measured cylinder pressure values;

testing the neural network during a recall phase by using test data signals representing test measured structure-borne noise value wherein said neural network outputs determine test cylinder pressure value;

comparing said determined test cylinder pressure values with known test cylinder pressure values to provide a difference error; and if the measured error is below a predetermined error limit, measuring and providing to said neural network, structure-borne noise measurements of said specific internal combustion engine wherein said neural network outputs a determination of cylinder pressures of said specific internal combustion engine.

2. The method according to claim 1, further comprising the act of determining, by means of said neural network, pressure measurement of all cylinders of said specific internal combustion engine.

3. The method according to claim 1, further comprising the act of operating at least one exhaust valve of said cylinder to provide said structure-borne noise.

4. The method according to claim 1, further comprising the act of producing structure-borne noise during ignition of the fuel mixture of the respective cylinder in a following power stroke of said specific internal combustion engine.

5. The method according to one of claims 1, further comprising the act of measuring power of a noise signal to provide said structure-borne noise.

6. The method according to claim 1, further comprising the act of measuring absolute maximum value of a noise signal to provide said structure-borne noise.

7. The method according to claim 1 further comprising the act of measuring power of a noise signal and a maximum value of a noise signal with the power of the noise signal being given a higher weighting in the upper load range than the maximum value of the noise signal and with the maximum value of the noise signal being given a higher weighting in the lower load range than the power of the noise signal in order to provide said structure-borne noise.

* * * * *